Patented Oct. 25, 1932

1,884,405

UNITED STATES PATENT OFFICE

ADRIANUS JOHANNES VAN PESKI, OF AMSTERDAM, NETHERLANDS, ASSIGNOR TO NAAMLOOZE VENNOOTSCHAP DE BATAAFSCHE PETROLEUM MAATSCHAPPIJ, OF THE HAGUE, NETHERLANDS

MANUFACTURE OF ALCOHOLS

No Drawing. Application filed November 1, 1930, Serial No. 492,868, and in Great Britain November 6, 1929.

The invention relates to a process for the manufacture of alcohols from the corresponding sulphuric esters or like esters obtained in the well known way by absorbing olefines in sulphuric acid or other suitable strong acids, such as phosphoric acid or strong sulphonic acids.

The process according to the invention is particularly advantageous in that it allows alcohols and a valuable by-product to be produced in an economical manner, as will be described hereinafter.

It is known that esters are formed by absorbing olefines in sulphuric acid and that on being hydrolyzed these esters yield the corresponding alcohols.

The concentration of the acid to be used for absorbing the olefines has to be chosen in accordance with the nature of the olefine to be absorbed; it is often necessary therefore to dilute the commercial acid to a suitable degree in order to obtain an acid of the correct concentration.

It is known that the tertiary alcohols in particular and also the secondary alcohols are in part destroyed by the action of the acid in the reaction liquid, even when the liquid is diluted to a high degree, so that, on subjecting the diluted reaction liquid to distillation, the yield of alcohols is considerably decreased. In order to overcome this drawback it has already been proposed to neutralize the acid reaction liquid before distilling. Even this expedient can be improved on.

I have found, quite unexpectedly, that the absorption of the olefines in strong acid can be satisfactorily effected if the acid is diluted with an aqueous solution of the corresponding ammonium salt. Even when a concentrated solution, say a solution containing 40 per cent of ammonium sulphate, is added to strong sulphuric acid, so that a solution containing 65 per cent of $H_2SO_4$ results, no difficulty is experienced in the absorption of olefines in comparison with an absorbing acid containing 65 per cent of $H_2SO_4$ and 35 per cent of water.

According to the invention the process for the manufacture of alcohols from the corresponding sulphuric acid or like esters obtained by absorbing olefines in sulphuric acid or other suitable strong acids such as phosphoric acid or strong sulphonic acids and distilling off the alcohols is characterized by the step of diluting the acid with a quantity of a corresponding ammonium salt before absorbing the olefines.

In accordance with the invention the acid liquid containing the ammonium salt may be neutralized wholly or in part for example with aqueous or gaseous ammonia or a suitable ammonium salt such as ammonium carbonate or ammonium carbamate and, if desired, with addition of water before the distillation to obtain the alcohols is effected and, after crystallization of ammonium salt and removal from the liquid remaining after the distillation has been effected, a sufficient quantity of the mother liquor with or without dilution is added to a fresh quantity of the acid to provide an acid of the correct concentration suitable for absorbing a fresh quanity of olefine.

It will be clear that by wholly or partly neutralizing the liquid, after the absorption has taken place, with the base, the corresponding salt is formed. Thus, for instance, in case sulphuric acid is used and the neutralization is effected with ammonia, ammonium sulphate will be formed. The ammonium salt remains in the liquid after the distillation, contingently together with any catalyst which may have been used in the olefine absorption.

Adding the said liquid to a fresh quantity of acid in order to bring same to the desired concentration, has the advantage that a fresh supply of catalyst is not required or no work is involved in recovering the catalyst present in the said liquid.

Another advantage offered by the process described above is that by repeatedly using the liquid remaining after the distillation of the alcohol for diluting fresh acid in order to bring it to a concentration suitable for absorbing the olefines, such liquid gradually contains more and more salt, which, finally as the liquid becomes saturated, crystallizes out and may then be easily removed therefrom, whilst the remaining liquid can again be added, wholly or partly, to the strong acid.

It is, of course, possible that already after one treatment solid salt will crystallize out of the liquid remaining after the distillation; this depends on the temperature to which the liquid is cooled and on the quantity of water present therein.

In this way valuable by-products, for instance ammonium sulphate or ammonium phosphate, which may serve as constituents of artificial manure, may be obtained according to the present process with hardly any additional cost.

In order to promote the crystallization of the salt, the liquid remaining after the distillation of the alcohol may be cooled and any well known method may be applied to separate the solid constituents from the liquid.

If the absorption of the olefines is to be performed at elevated temperatures, it may be advantageous to utilize the heat contained in the liquid remaining after distillation for imparting a higher temperature to the absorption liquid.

It will be understood that the process is by no means restricted to the manufacture of particular alcohols, although, as stated above, it is particularly advantageous for the production of tertiary and secondary alcohols, which are apt to be destroyed when distilled in the presence of even diluted acid.

Instead of one olefine, several olefines may be absorbed and also gases or liquids containing one or more olefines may be brought into contact with the strong acid. The absorption of the olefines may be promoted in any suitable and well known way.

The following examples illustrate the process:

1. 50.6 grams of strong sulphuric acid of 96% is diluted with 41 grams of an aqueous solution containing 40 per cent of ammonium sulphate and a very small quantity of $K_3Fe(CN)_6$ which acts as a catalyst in promoting the absorption of the olefines. The aforesaid aqueous solution was that remaining after the distillation of the alcohol obtained in a previous treatment. After the dilution the concentration of the sulphuric acid amounts to 65 per cent. This acid is brought into contact with 58 grams of technical butylene which consists of a mixture of 30 per cent of normal butylene, 54 per cent of isobutylene and 16 per cent of saturated hydrocarbons.

In consequence of the said acid concentration only the isobutylene is absorbed. After the absorption the mass is neutralized with an aqueous solution containing 25 per cent of ammonia, whereafter the tertiary butyl alcohol is distilled off by steam injection, the volume of the liquid being kept constant. The distillate after being dried with potassium carbonate and redistilled, consists of 34.5 grams of pure tertiary butyl alcohol. From the residue, cooled down to 0° C., 15 grams of pure ammonium sulphate crystallizes out. The mother lye, consisting of 133 grams of a 40 per cent ammonium sulphate solution may be used again for diluting the strong acid as described above.

When, instead of an aqueous solution containing 40 per cent of ammonium sulphate, pure water is used for diluting the acid, the yield of pure tertiary butyl alcohol is also 34.5 grams if the other steps are the same as those described in the above example.

2. 79.2 grams of $H_2SO_4$ of 96% are diluted with 67.4 grams of an aqueous solution of ammonium sulphate containing 39.2% of $(NH_4)_2SO_4$. This mass is agitated during one hour with 52.5 grams of trimethylethylene at 0° C. After neutralizing with a 25% ammonia solution the mass is distilled with steam and the distillate separated by means of potassium carbonate. 65 grams of tertiary amyl alcohol dried over $K_2CO_3$ are obtained (theoretical yield = 66 grams). (A blank experiment, i. e. without adding ammonium sulphate yields also 65 grams of tertiary amyl alcohol dried over $K_2CO_3$).

After cooling the mass remaining in the distillation vessel ammonium sulphate crystallizes out. The mother lye thereof containing 39.2% of $(NH_4)_2SO_4$ is again used for diluting fresh sulphuric acid.

3. 115.3 grams of 85% $H_3PO_4$ are diluted with 39.8 grams of an aqueous solution of diammonium phosphate containing 36.5% by weight of $(NH_4)_2HPO_4$. This mass is agitated during three hours with 56 grams of isobutylene. The homogeneous liquid thus obtained is diluted, neutralized with a 25 per cent aqueous solution of ammonia and distilled with steam. A yield of 72 grams of tertiary butyl alcohol, dried over $K_2CO_3$ is obtained. (A blank experiment yielded 73.5 grams.) After cooling the mass remaining in the distillation vessel, diammonium phosphate crystallizes out and the mother lye thereof is again used for diluting fresh phosphoric acid in order to give the same the correct concentration for absorbing a fresh quantity of isobutylene.

While in the appended claims sulphuric acid is referred to, it is to be understood that phosphoric acid and strong sulphonic acids are to be considered as equivalents of sulphuric acid for the purposes of the present invention.

What I claim is:—

1. In a process for the manufacture of alcohols from the corresponding sulphuric acid esters obtained by absorbing olefines in sulphuric acid and distilling off the alcohols; the improvement which comprises diluting the acid with a quantity of the corresponding ammonium salt prior to absorbing the olefines.

2. A process as claimed in claim 1, wherein the acid liquid, after the absorption of the olefines, is neutralized with ammonia.

3. A process for the manufacture of absorption-products of olefines in sulphuric acid, characterized by the step of diluting the acid with a quantity of the corresponding ammonium salt prior to absorbing the olefines.

4. A process as claimed in claim 3, wherein the acid liquid after the absorption of the olefines is wholly neutralized.

5. A process as claimed in claim 3, wherein the acid liquid after the absorption of the olefines is partially neutralized.

6. A process as claimed in claim 3, wherein the acid liquid after the absorption of the olefines is neutralized with ammonia.

7. A process as claimed in claim 3, wherein the acid liquid after the absorption of the olefines is neutralized with ammonium carbonate.

8. A process as claimed in claim 3, wherein the acid liquid after the absorption of the olefines is neutralized with ammonium carbamate.

9. A process as claimed in claim 3, wherein the acid liquid after the absorption of the olefines is neutralized with ammonia, the resulting liquid is distilled to obtain alcohols, any ammonium salts crystallizing out of the residue are recovered and the mother liquors remaining after separation of the crystallized ammonium salts are used for diluting fresh quantities of sulphuric acid.

10. A process as set forth in claim 3, wherein the acid liquid after the absorption of the olefines is neutralized with ammonia, and the neutralized liquid is diluted with water prior to the distillation.

11. A process for the manufacture of absorption-products of olefines in sulphuric acid in the presence of a catalyst, characterized by the step of diluting the acid with a quantity of the corresponding ammonium salt prior to absorbing the olefines.

In testimony whereof I have affixed my signature.

ADRIANUS JOHANNES van PESKI.